United States Patent Office 2,918,940
Patented Dec. 29, 1959

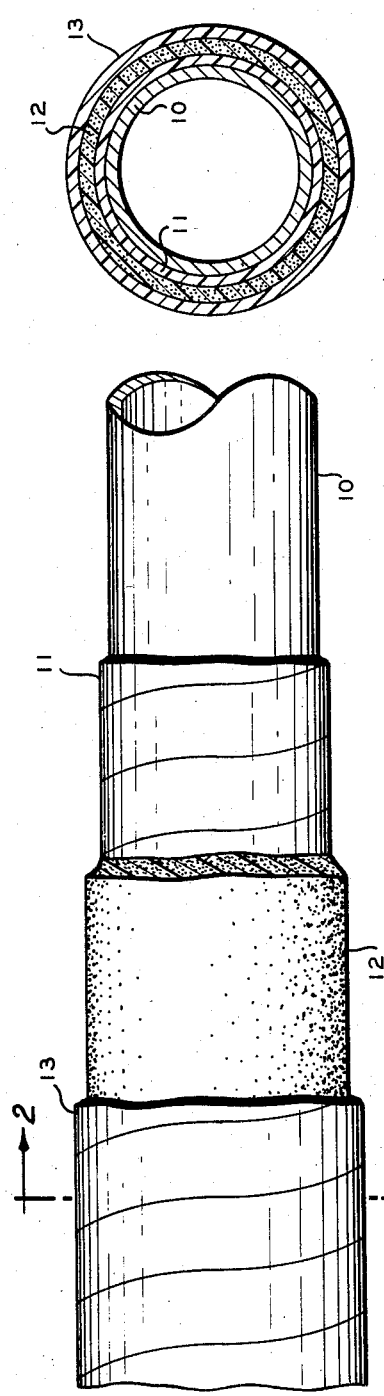
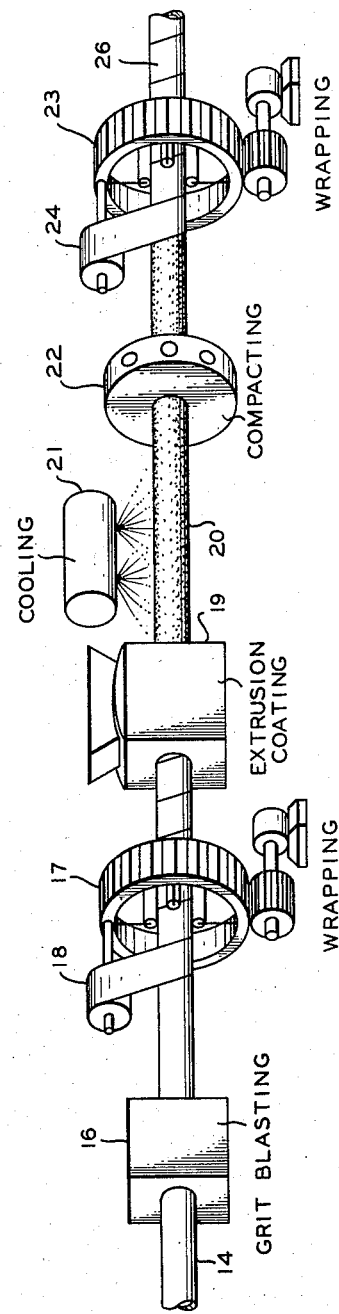

2,918,940

ASPHALTIC COATING COMPOSITION AND METHOD OF APPLICATION

Donald E. Carr, Bartlesville, Okla., assignor to Phillips Petroleum Company, a corporation of Delaware Application October 28, 1957, Serial No. 692,647

11 Claims. (Cl. 138—68)

This invention relates to an improved asphaltic coating composition. In another aspect this invention relates to a pipe product having its exterior surface protected with a novel combination of coating materials. In still another aspect this invention relates to a method of applying an improved protective coating to the exterior of pipe.

Many types of coating compositions have been developed in recent years for the protection of pipe and other metal surfaces against corrosion caused by soil acids, atmospheric conditions, humidity, sea water, plant fumes and the like. Coatings of coal tar, pitch and asphaltic compositions have been found to contain their particular advantages for specific applications. Rubberized asphaltic compositions have proven valuable in coating pipe which is to be laid under water. Compositions of this type, however, have not exhibited the toughness necessary to withstand impact and abrasion in rough handling. Uneven pressures on the composition, such as would occur when the pipe comes to rest on a submerged object, have caused such coatings to deform and develop thin spots, thereby reducing their effectiveness. Pipe which is to be laid underground is subjected to corrosive activity and to soil stresses which can be quite severe.

According to my invention a coating composition is provided which at elevated temperatures is sufficiently fluid to allow extrusion coating of piping, yet hardens to a tough, elastic composition which is capable of withstanding considerable impact, abrasion and external stresses. Broadly the composition of my invention comprises a mineral filler in a mastic of blended asphalt, rubber and at least one of the materials selected from the group consisting of highly crystalline olefin polymers and halogenated olefin polymers which are highly crystalline in their unhalogenated state. This composition can be blended in a fluid condition, mixed with the mineral filler, and applied to the metal surface while still fluid, such as by extrusion in a continuous coating upon a pipe. In pipe coating applications an improved bond is obtained by first wrapping the pipe with a pressure-sensitive tape of highly crystalline polyethylene. The steps of the coating process preferably include a cleaning treatment for the pipe, such as grit blasting or sand blasting, wrapping the pipe with the pressure-sensitive tape of polyethylene, extrusion coating with the composition above described, cooling with water sprays or cool air, compacting the extruded coating, with mechanical tamping devices or high velocity air jets, and finally wrapping with an outer layer of the pressure-sensitive polyethylene tape. The final tape-wrapping step can be omitted if desired, but it is highly desirable in applications where the pipe is to be stored and transported considerable distances or will be subjected to rough handling. Although firm bonds are formed between the several layers of coatings and the pipe, sufficient elasticity is retained and the continuity of the coating is not disrupted when the pipe is subjected to sudden and severe stresses.

It is an object of my invention to provide an improved asphaltic coating composition. It is another object of my invention to provide a method of applying a protective coating to pipe. Still another object is to provide a pipe-product which has its exterior surface protected with an improved asphaltic composition in combination with polyethylene tape. It is a still further object to provide a coated pipe-product which can be subjected to rough handling without disrupting the continuity of the protective coating and which can be used in a wide variety of applications. Other objects, advantages and features of my invention will be apparent to those skilled in the art from the following description, claims and drawings in which:

Figure 1 is a diagram showing each layer of the protective covering on a pipe;

Figure 2 is a cross-section of the complete covering along plane 2—2 of Figure 1; and Figure 3 is a schematic diagram of the preferred process for applying my improved coating composition and the adjacent films to a pipe.

By incorporating both rubber and ethylene polymer and/or halogenated ethylene polymer into the asphalt, a broad range of physical properties is possible to meet the needs of specific applications. For most formulations, however, tensile strength, elasticity, impact strength, plus resistance to water, and corrosive materials are adequate to meet the average requirement. This utility extends to pipeline which is to be laid under water as well as that which is to be laid underground, and surface pipe which is exposed to the atmospheric conditions and plant chemicals. Thus my invention provides an all purpose pipe which can be transported considerable distances before using. The coating has advantages for a pipe supplier and the small consumer who can not afford to have expensive pipe coating equipment at the site of his operations. In such a method of operation a suitable coating composition, such as is known in the trade as "cold dope," can be applied either by hand or by simple, inexpensive apparatus to the bare sections of pipe which remain after the pipe sections are joined together. As an additional advantage the major proportions by weight of the composition comprise asphalt and mineral filler which are readily available and quite cheap. Although the rubber and olefin polymer and/or halogenated olefin polymer are used in relatively small amounts, they impart valuable physical characteristics to the overall composition as shown by the examples.

The asphalts which are used in my invention cover a wide range of asphalt including either natural asphalt or residue from the distillation of petroleum. The preferred asphalts are those having a high resin content and a relatively low oil content. These asphalts can be characterized by a ring and ball softening point in the range about 50 to 225° F., preferably above 85° F., a specific gravity in the range of about 0.95 to 1.15, preferably 1.0 to 1.1, a penetration value (ATSM D5–49) in the range of about 10 to 200 at 77° F., and a viscosity in Saybolt Furol seconds below 250 at 210° F. These asphalts generally have low bromine numbers, high naphthenic to paraffinic ratios, high asphaltine to asphaltic ratios and are prepared by concentration of cracked residue, by vacuum or steam distillation, or by air blowing. Asphalts which are known in the trade as "albino" asphalts are particularly preferred in the coating composition of my invention. Properties of the asphalts employed should be such that the asphalt does not bleed out of the composition.

The rubber which is used in the composition can be either natural rubber or synthetic polymers or copolymers. The synthetic rubbers employed are preferably polymers of open chain conjugated dienes having from 4 to 8 carbon atoms per molecule, for example 1,3-butadiene, 2,3-dimethyl-1,3-butadiene, and the like. Examples of such polymers are polybutadiene, polyisoprene, polychloroprene, and the like. Copolymers of mixtures of such conjugated dienes can also be used as well as copolymers of monomer systems having a major amount of conjugated diene with a minor amount of copolymerizable monomer containing a $CH_2=C<$ group.

Examples of such synthetic elastomers are butadiene-styrene copolymers, butadiene-acrylonitrile copolymer, and various vulcanizable solid or semi-solid isoolefin-conjugated diene copolymers. Other copolymizable monomers which can be used with the class of conjugated dienes described include alpha-methylstyrene, 4-chlorostyrene, 5-methylstyrene, 4-methoxystyrene, 2-vinyl-pyridine, 2-methyl-5-vinylpyridine, 5-methyl-2-vinylpyridine, 5-ethyl-2-vinylpyridine, 4-methyl-2-vinylpyridine, 2-isopropenylpyridine, 5-propyl-2-isopropenylpyridine, 2-octyl-5-vinylpyridine, methacrylonitrile, methyl acrylate, methyl methacrylate, ethyl acrylate, ethyl methacrylate, ethyl vinyl ketone, methyl isopropenyl ketone, methyl vinyl ether, and the like.

The third material which comprises the matrix of my composition can be either a solid highly crystalline polyolefin prepared as subsequently described or preferably a halogenated product of such a polyolefin. As will be described hereinafter the preferred highly crystalline polyolefins are prepared by a chromium-oxide catalyzed polymerization and comprise ethylene homopolymers and copolymers of ethylene with other aliphatic monoolefins such as propylene, butene-1, butene-2, and the like, in which the copolymers contain at least 80 percent polymerized ethylene.

To prepare the preferred polyolefins, ethylene or mixtures of ethylene with aliphatic monoolefins containing a maximum of 8 carbon atoms per molecule and no branching nearer the double bond than the four position are polymerized in the presence of a catalyst comprising, as an essential ingredient, chromium oxide, preferably including a substantial amount of hexavalent chromium (for example at least about 0.1 percent by weight of the total catalyst). The chromium oxide is ordinarily associated with at least one other oxide, particularly at least one porous oxide selected from the group consisting of silica, alumina, or zirconia and thoria. The total chromium content of the catalyst in its preferred form is between 0.1 and 10 weight percent although higher chromium contents are at times advantageous.

The polymerization is preferably conducted with the ethylene or mixture of ethylene with other olefins in admixture with a hydrocarbon which is inert and can be maintained in a liquid phase under the polymerization condition. Suitable hydrocarbons are paraffins or cycloparaffins, for example, normal heptane, 2,2,4-trimethylpentane, cyclohexane, methylcyclohexane, normal pentane, isopentane and the like. The temperature for the polymerization reaction is usually in the range of about 100 to 500° F. with a temperature in the range of 150 to 375° F. being preferred for the polymerization of ethylene. A continuous slurry type reaction technique is generally used with the catalyst being in powdered form, for example from 40 to 100 mesh, and suspended in the hydrocarbon solvent. A pressure sufficient to maintain the solvent in the liquid phase is employed, for example from about 200 to 700 pounds per square inch absolute, although higher pressures can be used. The polymerization can also be conducted in the gas phase. When polymerizing with a suspended catalyst in the liquid phase the preferred temperature is about 200 to 325° F.

The preparation of such polyolefins is described in greater detail in the copending United States patent application of J. P. Hogan and R. L. Banks, Serial No. 573,877, filed March 26, 1956, now U.S. Patent 2,825,721.

Polymers prepared by the above described process are characterized by their unusually high density and high degree of crystallinity. For example, the ethylene polymers have a crystallinity of at least 70 percent, preferably at least 80 percent, and more desirably at least 90 percent at 25° C. The crystallinity is preferably determined by measurements of nuclear magnetic resonance (Wilson and Pake, Journal of Polymer Science 10, 503 (1953)) using a sample of polymer which is in a state approaching equilibrium at 25° C. An approach to this equilibrium state can be achieved by heating the polymer sample to a temperature about 50° C. above its crystalline melting point, maintaining the sample at this temperature for one hour, and then cooling to 25° C. at a rate characterized by a fall of about 1.5° C. per minute at 135° C. The crystallinity can also be determined according to the method of Matthews, Peiser and Richards, Atka Crystallographica 2, 85 (1949), using a polymer sample treated according to the foregoing procedure.

The ethylene polymers are further characterized by a density of at least 0.94 grams per cubic centimeter, preferably at least 0.95 at 25° C. The softening point of the polymer will vary with the particular polymer used increasing as the density and crystallinity of the polymer increases. Generally the softening point is above about 240° F., preferably in the approximate range of 250 to 300° F. and is several degrees, for example at least 10° F. higher than the melting point of the polymer. The softening point is determined by a method adapted from the method of Karrar, Davis and Dietrich, Industrial and Engineering Chemistry (Analytical Edition) 2, 96 (1930). The softness for the polymer is determined as described in this article over a range of temperatures and plotted to form a curve showing softness increasing with temperature. The softening temperature is, by definition, the point at which the slope of the curve equals the tangent of 60°. The polymers as above described generally have an inherent viscosity of at least 0.8, and preferably an inherent viscosity between about 1.2 and 10, as determined for a solution of 0.2 gram of polymer in 50 cubic centimeters of tetralin at 130° C.

While it is preferred to prepare the highly crystalline olefin polymers which are to be employed in the present invention as above described, any process which yields a product having the desired physical characteristics of density and crystallinity can be employed. For example aliphatic 1-olefins or mixtures thereof can be polymerized in the presence of a number of catalyst systems, preferably comprising an organo-metal derivative as one component. Such catalyst compositions can have two or more components, one component being an organo-metal component, a metal hydride, or a group I, II, or III metal and the other component being a compound of a group IV to VI metal. With certain of the above two component systems an organic halide having 30 or less carbon atoms per molecule or a metal halide can be used advantageously as a third catalyst component. Salts of titanium, zirconium, thorium, uranium and chromium are exceptionally suitable. Mixtures of tetrachlorides, oxychlorides, or acetylacetonates of these metals with aluminum trialkyls rapidly convert ethylene to high molecular weight polyethylene, even at low pressures and temperatures. The reaction is usually carried out in a reaction medium comprising an aliphatic or hydroaromatic hydrocarbon such as pentane, hexane, cyclohexane, tetrahydronaphthalene and the like. Homopolymers of ethylene, propylene, 1-butene and copolymers of various aliphatic 1-olefins of high crystallinity can be prepared by such processes, and these polymers have utility in the present invention.

Formation of solid polymers of olefins, such as ethylene, by such a process is disclosed in the copending U.S. patent application of J. A. Reid, Serial No. 494,281, filed March 14, 1955, which discloses polymerization of ethylene by contact with catalyst systems comprising an organo-metallic compound such as trialkylaluminum, for example, triethylaluminum or triisobutylaluminum, and halides of metals of group IV of the periodic system, such as titanium or zirconium tetrachloride. The formation of solid polymers of olefins, such as ethylene, in the presence of catalyst systems comprising an organo-metal and metallic-halides, such as diethylaluminum chloride and/or ethylaluminum dichloride and a group IV metal halide, such as titanium or zirconium tetrachloride, is is disclosed in the copending United States patent application of H. D. Lyons and G. Nowlin, Serial No. 495,045, filed March 17, 1955.

Additional examples of suitable catalyst systems of the classes above described are triethylaluminum and titanium tetrachloride, mixtures of ethylaluminum halides and titanium tetrachloride, titanium tetrachloride and sodium or magnesium, titanium tetrachloride with lithium aluminum hydride and ethyl bromide, tridodecylaluminum and titanium tetrachloride, triethylaluminum and zirconium acetylacetonate, triethylaluminum and tungsten hexachloride, triethylaluminum and potassium titanium hexafluoride and triisobutylaluminum with zirconium tetrabutoxide.

Alternatively as a third component to be blended with the asphalt and rubber or as a fourth component which is used in addition to the polyolefin, a halogenated product of thea bove described polyolefin can be used. Because of the increased degree to which small amounts of the halogenated olefin polymer affect the properties of the over-all composition, I prefer to employ material of this type to prepare the all-purpose protective coatings of my invention. It should be understood that halogenated polyolefins broadly are not applicable in my invention but rather only the halogenated product of the high density, highly crystalline olefine polymers, preferably the homopolymers or copolymers of ethylene or propylene as described above. Customary methods of halogenating polyethylenes prepared by processes employing high pressures and temperatures to produce a relatively low softening polymer having a high amorphous content are not ordinarily preferred for the halogenation of the highly crystalline, high density polymers which are useful in my invention. Successful methods of halogenation have been discovered, however, by which these highly crystalline polymers can be modified to produce improved products. Such halogenation methods are described in the copending United States patent applications of P. J. Canterino, Serial No. 442,891, filed July 12, 1954, and P. J. Canterino and J.N. Baptist, Serial No. 446,666, filed July 29, 1954.

The highly crystalline olefin polymers as above described are substantially insoluble in carbon tetrachloride and other low boiling chlorinated solvents at atmospheric pressure. Halogenation can be effected in solution in such a solvent, however, at a temperature above the normal boiling point of the solvent and below the temperature at which the polymer begins to decompose at superatmospheric pressure sufficient to maintain the solvent substantially in the liquid phase. The halogenating reaction is one which introduces a halogen selected from the group consisting of chlorine, bromine, and iodine into the molecule. Ordinarily only one halogen species is used, although mixtures can be used to form a polymer having more than one halogen in the molecule. The temperature of such a halogenation is above the normal boiling point of the solvent but not over 150° C. and preferably is in the range of 95 to 130° C. when carbon tetrachloride is the solvent. Although higher pressures can be used, only those necessary to maintain the solvent substantially in a liquid phase are necessary. Catalysts, although not absolutely necessary, can be used to promote the reaction. Suitable catalysts are peroxides, or hydroperoxides such as benzoyl peroxide, diisopropylbenzene hydroperoxide, cumene peroxide and the like. The reaction can also be promoted by sunlight or other radiation such as ultraviolet light. Suitable solvents are carbon tetrachloride, chloroform, methylene chloride, or other similar low boiling halogenated solvents which are relatively inert toward elemental halogen.

The chlorination of polyethylene can be conducted in two stages. The first stage comprises chlorinating polyethylene in solution in the solvent as previously described at superatmospheric pressure until a partially chlorinated product is obtained which is soluble in carbon tetrachloride or similar solvent at a temperature below the boiling point of the solvent at atmospheric pressure. Then, if desired, the temperature can be reduced and the chlorination continued in a second stage at a temperature less than or substantially equal to the reflux temperature of the mixture at atmospheric pressure. In another two stage halogenation process the polymer is dissolved in a solvent selected from the group consisting of tetrachloroethene, chlorobenzene, and dichlorobenzene during the first stage and the second stage conducted with the partially halogenated polymer in solution in a low-boiling chlorinated solvent selected from the group consisting of carbon tetrachloride, chloroform and methylene chloride.

Improved products can also be formed by halogenating the polymer in solution in a solvent to obtain a partial halogenated polymer containing upto about 20 weight percent of chemically combined halogen, precipitating the polymer, and continuing the halogenation with the polymer dispersed in the solvent to obtain a more highly halogenated polymer. In this final step the halogen is introduced by passing gaseous halogen into a gel of the partially halogenated polymer in a dispersing medium. The halogen-containing polymers which are preferred for use in the composition of this invention contain from about 25 to 30 percent by weight combined halogen.

In the ternary mixture of asphalt, rubber and polyolefin and/or halogenated polyolefin which comprises the matrix of the composition of the present invention, the asphalt constituent is present in an amount between about 50 and 85 weight percent. The rubber is present in an amount between about 10 and 30 weight percent on the same basis and the third component which is either the polyolefin or halogenated polyolefin above described or a combination of the two is present in an amount in the range of about 5 to 30 weight percent of the mixture. These materials are blended in the prescribed ratios and then mixed with mineral filler to form the coating composition. Examples of suitable mineral fillers are sand, gravel, limestone aggregate, and barite aggregates such as are employed in drilling muds. Fillers as above described, and particularly the barite aggregates, are employed where it is desired to add weight to the composition such as when the pipe is to be subjected to the buoyant force of water or mud. Other mineral fillers include talc, quartz, popped volcanic ash clay, diatomaceous earth and the like which are useful when weighting of the composition is not a consideration. Other fillers, such as glass fiber, can also be employed if desired. The amount and type of mineral filler depend upon the desired density of the coating composition. The amount of filler employed, however, generally is in the range of about 100 to 300 parts by weight of filler per 100 parts of asphaltic matrix. As shown by the following examples a variety of physical characteristics can be obtained by varying the ratios of the components of the asphaltic matrix. In these examples which are set forth to show the advantages of this invention, the proportions and specific materials are presented as being typical and should not be construed to limit the invention unduly.

*Example I.*—A 75/25 butadiene styrene rubber, prepared by emulsion polymerization at 41° F., and having a Mooney value (ML–4) of 20 is blended with a sample of highly crystalline polyethylene at a temperature of 300° F. The polyethylene is prepared by polymerizing ethylene in the presence of a chromium oxide-silica-alumina catalyst employing cyclohexane as a diluent at 285° F. and 450 pounds per square inch gage. The catalyst concentration for the polymerization of ethylene is 0.5 weight percent and the ethylene feed rate is 6 pounds per hour. The molecular weight of the polyethylene by the Staudinger method is 50,000, the crystallinity at 25° C. is 95 percent and the density of the polymer at 25° C. is 0.96 gram per cubic centimeter. A blend of 10 parts of rubber and 10 parts of polyethylene is combined with 80 parts by weight of an asphalt obtained from propane fractionation of a lubricating oil stock. The asphalt has a specific gravity at 60° F. to 1.0, a penetration value at 77° F. of 17, and a ring and ball softening point of 138° F. The ternary mixture is blended at a temperature of 285° F. and the resultant blend while in a substantially molten state is admixed with 200 parts by weight of barite aggregate. The resultant composition is then extruded onto 4-inch nominal size steel line pipe, said line pipe having been previously grit-blasted and wrapped with pressure-sensitive tape of polyethylene (from chromium oxide-catalyst polymerization). Immediately after the coated pipe leaves the extruder, the coating is cooled with water and compacted by means of high pressure air jets. The thus-applied coating is highly impervious to moisture and provides excellent protection for the pipe against corrosion due to sea water, soil acids, and the like. In addition the composition has a higher tensile strength than rubberized asphaltic compositions alone.

*Example II.*—The formulation of Example I is varied by reducing to 70 parts by weight the asphalt and adding 10 parts by weight of a chlorinated product of a polyethylene having a combined chlorene content of 30 percent, the polyethylene before chlorination having the characteristics of the material described in Example I. The resultant composition is likewise highly impervious to moisture and, while it has a lower tensile strength than the blend of Example I, it has greatly increased ductility and high impact strength. Pipes coated with this composition are thus provided with excellent protection against corrosive attack.

*Example III.*—A polybutadiene having a Mooney value (ML–4) of 40 is milled with the asphalt of Example I and the chlorinated polyethylene of Example II in the ratio of 10 parts of polybutadiene to 15 parts of chlorinated polyethylene and 75 parts by weight of asphalt. The resulting matrix is then mixed with 100 parts by weight of gravel aggregate to produce a protective composition having high ductility, high impact strength, and lower flex temperature than the previous blends. This composition, like those of Example I and II, provides excellent protection against corrosion for pipes and other steel members to which it is applied.

*Example IV.*—An easily processable matrix which is less rigid than those produced in the previous examples but still provides excellent corrosion resistance for pipes and other steel members is prepared by blending 50 parts by weight of the asphalt above described with 20 parts by weight of the rubber used in Example I and 30 parts of an ethylene-propylene copolymer polymerized from a monomer system comprising 90 parts of ethylene and 10 parts of propylene by weight in the presence of a chromium oxide-silica-alumina catalyst at polymerizing conditions comparable to those of Example I for the polymerization of ethylene.

*Example V.*—Five parts by weight of the chlorinated polyethylene described in Example II and 10 parts by weight of a rubbery copolymer of butadiene and 2-methyl-5-vinylpyridine polymerized in a ratio of 85 parts by weight of butadiene to 15 parts by weight of the pyridine comonomer are incorporated into 85 parts by weight of an asphalt having a penetration of 82 at 75° F., a ring and ball softening point of 116° F., and a specific gravity at 60° F. of 1.05. The resulting matrix is compounded with 200 parts by weight of pulverized quartz to produce a protective composition which is highly oil resistant, has excellent flexibility, is highly ductile and possesses high impact strength. Steel piping protected with this composition is useful in industrial applications in contact with oils and solvents which cause deterioration of conventional asphaltic coating compositions.

*Example VI.*—The formulation of the matrix of Example V is modified by decreasing the asphalt to 60 parts by weight, increasing the rubbery copolymer of butadiene and methylvinylpyridine to 30 parts by weight and substituting the polyethylene of Example I for the chlorinated product. The resulting matrix has a low electrical resistivity, high oil resistance, improved tensile strength over the matrix of Example V, and forms a good bond with the polyethylene of the pressure-sensitive film used to precoat the pipe.

The asphaltic matrix can be compounded in a number of ways. For example, the rubber and polyolefin and/or halogenated polyolefin can be dry-blended together. Alternatively these components can be milled together on a roll mill, said milling being carried out at a temperature above the softening point of each of these materials. The resultant blend of rubber and polyolefin and/or halogenated polyolefin can then be admixed with the asphalt in a variety of ways. For example this blend can be admixed with an aqueous emulsion of the asphalt, or the blend can be admixed with the asphalt while it is maintained at a temperature above its softening point. Still another method of formulating these compositions is to dry mix all the components of the binder and subsequently mill them together at a temperature above the softening point of the highest melting component. Addition of the mineral filler is preferably made after all the components of the binder have been formulated although incremental addition of the binder at any stage of the mixing process can be made. When glass fiber is employed as the mineral filler or a component of the mineral filler, it is preferred that it be added in the final mixing stage as prolonged milling or mixing the material containing glass fiber causes the glass to be broken down to a point where it no longer serves as a reinforcing agent.

In effecting uniform blends of the type described it is at times desirable to plasticize the polyolefin or halogenated polyolefin with selected aromatic oils prior to blending with the asphalt. An example of a suitable plasticizer is the phenol extract from the preparation of 250 SUS lubricating oil stock. Other methods of compounding these materials to effect uniform compositions will be apparent to those skilled in the art.

A preferred method of applying the coating composition to a metal surface, particularly to pipe, is by extruding the composition in a softened or fluid form onto the surface. The protective coating which I prefer is illustrated in Figure 1 of the drawing. As shown, pipe 10 is wrapped with a layer of pressure-sensitive polyethylene tape, the polyethylene having a high density and crystallinity as described for use in the asphaltic composition. Polyethylene films or tapes of this type are formed by producing the film from the molten polymer by well known techniques such as extrusion or rolling. The adhesive materials used can be those employed in making pressure-sensitive tapes of conventional polyethylene, such as described in United States Patent 2,664,378, issued December 29, 1953, to George W. Heller or the adhesive compositions of polyethylene resin compounded with halogenated aromatic hydrocarbons, described in U. S. Patent 2,622,056 issued December 16, 1952 to Robert A. De Coudres and Clayton S. Meyers. The thickness of the film can vary considerably, but is generally about 3 to 10 mils thick plus 1 to 4 mils of adhesive. The polyethylene tape is then covered by composition 12 which is the above described matrix of asphalt, rubber and polyolefin and/or halogenated polyolefin plus a mineral filler. Additional protection can be provided by an outer wrap of the pressure sensitive polyethylene tape 13. A cross-section of the three-layer coating on a metal pipe is shown in Figure 2.

The preferred method of applying the protective coating to a metal pipe is shown in Figure 3. The pipe 14 is first cleaned by grit blasting operation 16 and then wrapped in wrapping operation 17 with pressure sensitive polyethylene tape 18. The coating composition of asphaltic matrix and mineral filler is then applied in extrusion coating process 19 at a temperature above the softening point of the asphaltic matrix. Upon emerging from the extrusion coating operation the coating 20 is immediately cooled by water spray 21 sufficiently to reduce tackiness and then is compacted by air hammers 22 acting radially upon the coating. Possible coating thicknesses cover a broad range for specific applications. Ordinarily, however, the compacted asphaltic coatings are from ½ to 1½ inches thick. Although not necessary for adequate protection against corrosion, a second wrapping operation 23 can be performed, thus applying pressure-sensitive polyethylene tape 24 to produce the three-layer protective coating 26, as shown in Figures 1 and 2. The outer coating of polyethylene tape is of particular advantage when the pipe is to be coated and then stored or transported considerable distances before use. The external wrap is particularly helpful in making smooth pipe joints when sections of the pipe are later joined.

It is to be understood that a chlorinated product of the highly crystalline polyethylene is the preferred third component for use with the asphalt and rubber. Such a chlorinated polyethylene confers upon the asphaltic composition increased ductilities at normal and elevated temperatures, increases the flash and fire point of the composition, increases the viscosity so that the protective coating is less likely to be deformed, and reduces the water permeability more than 75% as compared to rubberized asphalt alone. In addition, temperature susceptibility is improved and the total recovery on deformation is doubled as compared to rubberized asphalt without the chlorinated polyethylene.

As will be evident to those skilled in the art, various modifications of this invention can be made or followed, in the light of the foregoing disclosure and discussion without departing from the spirit or scope thereof.

I claim:

1. A composition suitable for coating pipe comprising from 100 to 300 parts by weight of mineral filler in admixture with 100 parts by weight of asphaltic matrix comprising from 50 to 85 weight percent asphalt, from 10 to 30 weight percent of a rubber selected from the group consisting of natural rubber, synthetic polymers of open chain conjugated dienes having from 4 to 8 carbon atoms per molecule, and synthetic copolymers of said conjugated dienes with a minor amount of copolymerizable monomer containing a $CH_2=C<$ group, and from 5 to 30 weight percent of chlorinated polyethylene, characterized before chlorination by a crystallinity of at least 70 percent at 25° C., a density at 25° C. of at least 0.94 gram per cubic centimeter, and a softening temperature above about 240° F., said chlorinated polyethylene containing from about 25 to 30 weight percent combined chlorine.

2. A composition suitable for coating pipe comprising from 100 to 300 parts by weight of granular mineral solids in admixture with 100 parts by weight of asphaltic matrix comprising a uniform blend of 50 to 85 parts by weight high resin asphalt having a ring and ball softening point in the range of about 50 to 225° F., a specific gravity of about 0.95 to 1.15, and a penetration value of about 10 to 200 at 77° F., 10 to 30 parts by weight of a rubber selected from the group consisting of natural rubber, synthetic polymers of open chain conjugated dienes having from 4 to 8 carbon atoms per molecule, and synthetic copolymers of said conjugated dienes with a minor amount of copolymerizable monomer containing a $CH_2=C<$ group, and from 5 to 30 parts by weight of chlorinated polyethylene characterized before chlorination by a crystallinity at 25° C. of at least 90 percent, a density at 25° C. of at least 0.95 gram per cubic centimeter and a softening temperature above 250° F., and said chlorinated polyethylene containing from 25 to 30 weight percent combined chlorine.

3. A composition according to claim 2 in which said asphaltic matrix comprises asphalt, butadiene/styrene rubbery copolymer and chlorinated polyethylene.

4. A composition according to claim 2 in which said asphaltic matrix comprises asphalt, butadiene/2-methyl-5-vinylpyridine rubbery copolymer and chlorinated polyethylene.

5. A composition according to claim 2 in which said asphaltic matrix comprises asphalt, rubbery polybutadiene, and chlorinated polyethylene.

6. As an article of manufacture a coated pipe having high corrosion resistance comprising, in combination, a length of metal pipe, a film of highly crystalline polyethylene covering the outer surface of said pipe and an asphaltic coating covering the outer surface of said film, said coating comprising mineral filler in admixture with a matrix comprising asphalt, rubber, and at least one of the materials selected from the group consisting of highly crystalline olefin polymers and halogenated products of said olefin polymers.

7. As an article of manufacture a coated pipe having high corrosion resistance comprising, in combination, a length of metal pipe, a layer of pressure-sensitive polyethylene tape covering the outer surface of said pipe, said polyethylene being characterized by a crystallinity of at least 90 percent at 25° C., a density at 25° C. of at least 0.95 gram per cubic centimeter, and a softening temperature above 250° F., and an asphaltic coating covering the outer surface of said polyethylene tape, said coating comprising from 100 to 300 parts by weight of mineral filler in admixture with 100 parts by weight of asphaltic matrix comprising from 50 to 85 weight percent asphalt, from 10 to 30 weight percent rubber selected from the group consisting of natural rubber, synthetic polymers of open chain conjugated dienes having from 4 to 8 carbon atoms per molecule, and synethetic copolymers of said conjugated dienes with a minor amount of copolymerizable monomer containing a $CH_2=C<$ group, and from 5 to 30 weight percent of at least one of the materials selected from the group consisting of polyethylene, copolymers of ethylene with monoolefins of 3 to 4 carbon atoms per molecule, said polyethylene and copolymers of ethylene being characterized by a crystallinity of at least 70 percent at 25° C., a density at 25° C. of at least 0.94 gram per cubic centimeter, and a softening temperature above about 240° F., a chlorinated product of said polyethylene, and a chlorinated product of said ethylene polymers, said chlorinated products containing from about 25 to 30 weight percent combined chlorine.

8. As an article of manufacture a coated pipe having high corrosion resistance comprising, in combination, a length of metal pipe, a first layer of pressure-sensitive polyethylene tape covering the outer surface of said pipe, an asphaltic coating covering the outer surface of said polyethylene tape, said coating comprising from 100 to 300 parts by weight of granular mineral solids in admixture with 100 parts by weight of asphaltic matrix comprising a uniform blend of 50 to 85 parts by weight high resin asphalt having a ring and ball softening point in the range of about 50 to 225° F., a specific gravity of about 0.95 to 1.15, and a penetration value of about 10 to 200 at 77° F., 10 to 30 parts by weight rubber selected from the group consisting of natural rubber, synthetic polymers of open chain conjugated dienes having from 4 to 8 carbon atoms per molecule, and synthetic copolymers of said conjugated dienes with a minor amount of copolymerizable monomer containing a $CH_2=C<$ group, and from 5 to 30 parts by weight of at least one of the materials selected from the group consisting of polyethylene and a chlorinated product of said polyethylene containing from 25 to 30 weight percent combined chlorine, and a second layer of pressure-sensitive polyethylene tape covering the outer surface of said asphaltic coating, said polyethylene of said pressure-sensitive tapes and said asphaltic coating being characterized by a crystallinity at 25° C. of at least 90 percent, a density, at 25° C. of at least 0.95 gram per cubic centimeter and a softening temperature of at least 250° F.

9. A method of applying a protective covering to the exterior of pipe which comprises cleaning the surface of said pipe, wrapping said pipe with a layer of highly crystalline polyethylene tape, extrusion coating the wrapped pipe with an asphaltic composition comprising mineral filler in admixture with a matrix comprising asphalt, rubber, and at least one of the materials selected from the group consisting of highly crystalline olefin polymer and halogenated products of said olefin polymers, cooling said composition, and compacting said composition to form a dense coating of uniform thickness on said pipe.

10. A method of applying a protective covering to the exterior of pipe which comprises cleaning the surface of said pipe, wrapping said pipe with a layer of highly crystalline polyethylene tape, extrusion coating the wrapped pipe with an asphaltic composition comprising mineral filler in admixture with a matrix comprising asphalt, rubber, and at least one of the materials selected from the group consisting of highly crystalline olefin polymer and halogenated products of said olefin polymers, cooling said composition, compacting said composition to form a dense coating of uniform thickness on said pipe, and wrapping an outer layer of highly crystalline polyethylene tape about said dense coating.

11. A composition suitable for coating pipe comprising from 100 to 300 parts by weight of granular mineral solids in admixture with 100 parts by weight of asphaltic matrix comprising a uniform blend of 50 to 85 parts by weight high resin asphalt having a ring and ball softening point in the range of about 50 to 225° F., a specific gravity of about 0.95 to 1.15, and a penetration value of about 10 to 200 at 77° F., 10 to 30 parts by weight of butadiene/styrene rubbery copolymer and from 5 to 30 parts by weight of polyethylene and chlorinated polyethylene, said polyethylene and chlorinated polyethylene before chlorination thereof being characterized by a crystallinity at 25° C. of at least 90 percent, a density at 25° C. of at least 0.95 gram per cubic centimeter and a softening temperature above 250° F.

References Cited in the file of this patent

UNITED STATES PATENTS

| | | |
|---|---|---|
| 2,475,699 | Derksen | July 12, 1949 |
| 2,554,461 | Howes et al. | May 22, 1951 |

FOREIGN PATENTS

| | | |
|---|---|---|
| 153,595 | Australia | Oct. 12, 1953 |

OTHER REFERENCES

"Polyethylene" by Raff et al., vol. II of High Polymer Series, published 1956 by Interscience Publishers, p. 366. (Copy in Div. 50.)